(12) United States Patent
Ge et al.

(10) Patent No.: US 12,247,759 B2
(45) Date of Patent: Mar. 11, 2025

(54) SYSTEMS AND METHODS FOR AIR DEHUMIDIFICATION IN AN ENCLOSED SPACE

(71) Applicant: Nortek Air Solutions Canada, Inc., Saskatoon (CA)

(72) Inventors: Gaoming Ge, Saskatoon (CA); Philip Paul LePoudre, Saskatoon (CA)

(73) Assignee: Nortek Air Solutions Canada, Inc., Saskatoon (CA)

( * ) Notice: Subject to any disclaimer, the term of this patent is extended or adjusted under 35 U.S.C. 154(b) by 0 days.

(21) Appl. No.: 18/535,908

(22) Filed: Dec. 11, 2023

(65) Prior Publication Data

US 2024/0110712 A1 Apr. 4, 2024

Related U.S. Application Data

(63) Continuation of application No. 17/311,207, filed as application No. PCT/CA2019/051750 on Dec. 4, 2019, now abandoned.

(Continued)

(51) Int. Cl.
*F24F 3/147* (2006.01)
*A01G 9/24* (2006.01)
(Continued)

(52) U.S. Cl.
CPC ............ *F24F 3/147* (2013.01); *F24F 3/1417* (2013.01); *F24F 12/001* (2013.01);
(Continued)

(58) Field of Classification Search
CPC ...... F24F 3/1411; F24F 3/1417; F24F 3/1423; F24F 3/147
See application file for complete search history.

(56) References Cited

U.S. PATENT DOCUMENTS

| 4,987,750 A | 1/1991 | Meckler |
| 5,181,387 A | 1/1993 | Meckler |

(Continued)

FOREIGN PATENT DOCUMENTS

| CN | 1213251 | 8/2005 |
| EP | 3891439 | 10/2024 |

(Continued)

OTHER PUBLICATIONS

U.S. Appl. No. 17/311,207, filed Jun. 4, 2021, Systems and Methods for Air Dehumidification in an Enclosed Space.

(Continued)

*Primary Examiner* — Christopher R Zerphey
(74) *Attorney, Agent, or Firm* — Schwegman Lundberg & Woessner, P.A.

(57) ABSTRACT

Systems and methods for providing dehumidification to an enclosed space can include a dehumidification unit in a supply air plenum that receives return air and a regeneration unit in a scavenger air plenum that receives outdoor air. The system can operate in a wet mode and a dry mode, depending on outdoor air conditions and a relative humidity setpoint for the enclosed space. The dehumidification unit and regeneration unit are both operational in the wet mode to dehumidify the return air and regenerate dilute desiccant. In the dry mode, the dehumidification unit and regeneration unit are not needed, and dry outdoor air can be supplied to the enclosed space. A heat recovery system utilizes waste heat from either return air or scavenger air, depending on the operating mode, to heat the outdoor air before it is supplied to the enclosed space or before it is used for regenerating desiccant.

22 Claims, 7 Drawing Sheets

US 12,247,759 B2

Page 2

Related U.S. Application Data

(60) Provisional application No. 62/775,288, filed on Dec. 4, 2018.

(51) Int. Cl.
  *F24F 3/14* (2006.01)
  *F24F 12/00* (2006.01)

(52) U.S. Cl.
  CPC ............ *F24F 12/002* (2013.01); *A01G 9/246* (2013.01); *F24F 2003/1435* (2013.01); *F24F 2003/144* (2013.01); *F24F 2003/1458* (2013.01); *F24F 2012/007* (2013.01)

(56) References Cited

U.S. PATENT DOCUMENTS

| | | | |
|---|---|---|---|
| 5,325,676 A | | 7/1994 | Meckler |
| 5,435,150 A | * | 7/1995 | Khelifa ................ B60H 1/3202 62/271 |
| 5,448,895 A | | 9/1995 | Coellner et al. |
| 5,548,970 A | * | 8/1996 | Cunningham, Jr. .. F24F 3/1423 62/271 |
| 5,661,983 A | * | 9/1997 | Groten ................ B01D 53/261 62/57 |
| 5,761,923 A | * | 6/1998 | Maeda ................... F24F 3/1411 62/271 |
| 5,826,641 A | | 10/1998 | Bierwirth et al. |
| 5,966,955 A | | 10/1999 | Maeda |
| 6,083,300 A | * | 7/2000 | McFadden ............. B01D 53/06 96/125 |
| 6,199,392 B1 | * | 3/2001 | Maeda ................. F24F 3/1423 62/271 |
| 6,334,316 B1 | * | 1/2002 | Maeda .................... F24F 5/001 62/271 |
| 6,751,964 B2 | | 6/2004 | Fischer |
| 7,309,062 B2 | | 12/2007 | Lin |
| 7,938,888 B2 | | 5/2011 | Assaf |
| 8,828,128 B1 | | 9/2014 | Parker et al. |
| 9,109,808 B2 | | 8/2015 | Gerber et al. |
| 9,234,665 B2 | | 1/2016 | Erb et al. |
| 9,423,140 B2 | | 8/2016 | Betts et al. |
| 9,631,823 B2 | | 4/2017 | Vandermeulen et al. |
| 9,631,848 B2 | | 4/2017 | Vandermeulen et al. |
| 9,709,285 B2 | * | 7/2017 | Vandermeulen ...... F24F 3/1417 |
| 9,810,439 B2 | * | 11/2017 | Coutu ................. F28D 21/0015 |
| 10,197,310 B2 | * | 2/2019 | Ghadiri Moghaddam .................. H05K 7/20745 |
| 10,584,884 B2 | | 3/2020 | Coutu et al. |
| 11,525,600 B2 | | 12/2022 | Lee |
| 2009/0071812 A1 | | 3/2009 | Koban et al. |
| 2010/0224688 A1 | * | 9/2010 | Yabu ...................... F24F 3/1411 62/271 |
| 2010/0300123 A1 | | 12/2010 | Park et al. |
| 2012/0047923 A1 | | 3/2012 | Wintemute et al. |
| 2012/0216558 A1 | | 8/2012 | Dempsey et al. |
| 2012/0247132 A1 | * | 10/2012 | Lakdawala ........... F24F 5/0071 62/189 |
| 2014/0260367 A1 | | 9/2014 | Coutu et al. |
| 2014/0260369 A1 | | 9/2014 | Lepoudre et al. |
| 2018/0073753 A1 | | 3/2018 | Lepoudre et al. |
| 2022/0003435 A1 | | 1/2022 | Ge et al. |

FOREIGN PATENT DOCUMENTS

| | | |
|---|---|---|
| GB | 2548590 | 9/2017 |
| KR | 20000074022 | 12/2000 |
| KR | 100943285 | 2/2010 |
| KR | 20140081785 | 7/2014 |
| WO | 2013054322 | 4/2013 |
| WO | 2015143332 | 9/2015 |
| WO | 2016074077 | 5/2016 |
| WO | 2016183668 | 11/2016 |
| WO | 2017117644 | 7/2017 |
| WO | 2018052499 | 3/2018 |
| WO | 2018191805 | 10/2018 |
| WO | 2018191806 | 10/2018 |
| WO | 2020113337 | 6/2020 |

OTHER PUBLICATIONS

"Calorex Heat Recovery Dehumidification (HRD) System", Calorex Heat Pumps Ltd, (2017), 8 pgs.

"Alfa Laval Liquid Desiccant Dehumidification Systems Product Guide", Alfa Laval Kathabar, (2018), 9 pgs.

"Ecodry CNREC: Dehumidifier with heat recovery", Rossato Group Srl, [Online] Retrieved from the Internet: URL: https:en.rossatogroup.com/dehumidifier-with-heat-recovery.html, (Retrieved on Jan. 28, 2020), 12 pgs.

"Advances in Desiccant-Based Dehumidification", Trane Engineers Newsletter, 34(4), (Sep. 2005), 8 pgs.

"Israeli technology saves energy in commercial greenhouse, controls humidity, protects crops", Horti Daily, [Online] Retrieved from the Internet: URL: https:www.hortidaily.com/article-6112-Israeli-technology-saves-energy-in-commercial-greenhouse,-controls-humidity,-protects-crops , (Jan. 29, 2014), 4 pgs.

"International Application Serial No. PCT CA2019 051750, International Search Report mailed Jan. 30, 2020", 3 pgs.

"International Application Serial No. PCT CA2019 051750, Written Opinion mailed Jan. 30, 2020", 6 pgs.

"International Application Serial No. PCT CA2019 051750, International Preliminary Report on Patentability mailed Jun. 17, 2021", 8 pgs.

"European Application Serial No. 19893225.3, Response Filed Jan. 24, 2022 to Communication Pursuant to Rules 161(2) and 162 EPC mailed Jul. 13, 2021", 15 pgs.

"European Application Serial No. 19893225.3, Extended European Search Report mailed Nov. 14, 2022", 9 pgs.

"U.S. Appl. No. 17/311,207, Non Final Office Action mailed Apr. 4, 2023", 18 pgs.

"U.S. Appl. No. 17/311,207, Response filed Jun. 30, 2023 to Non Final Office Action mailed Apr. 4, 2023", 16 pgs.

"U.S. Appl. No. 17/311,207, Final Office Action mailed Jul. 11, 2023", 18 pgs.

Abdel-Salam, Ahmed Hamdi, "A Novel Liquid Desiccant Air Conditioning System with Membrane Exchangers and Various Heat Sources", PhD Dissertation at the U. of Saskatchewan, Saskatoon, (Sep. 2015), 272 pgs.

Abdel-Salam, Mohamed Rh, "Expected energy and economic benefits, and environmental impacts for liquid-to-air membrane energy exchangers (LAMEEs) in HVAC systems: A review", Applied Energy, 127, (2014), 202-218.

Kassai, Miklos, "Dehumidification Performance Investigation of Run-Around Membrane Energy Exchanger System", Thermal Science, 20(6), (2016), 14 pgs.

Kassai, Miklos, "Experimental Effectiveness Investigation of Liquid-to-air Membrane Energy Exchangers under Low Heat Capacity Rates Conditions", Experimental Heat Transfer, 29(4), (2016), 445-455.

Liu, Shuli, "A Novel Heat Recover Desiccant Cooling System", PhD Thesis at the U. of Nottingham, [Online] Retrieved from the Internet URL: http:eprints.nottingham.ac.uk/116021/A_Novel_Heat_Recovery_and_Dessicant_Cooling_System.pdf, (May 2008), 247 pgs.

Lowenstein, Andrew, "Review of Liquid Desiccant Technology for HVAC Applications", ASHRAE HVACandR Research, 14(6), (Nov. 2008), 22 pgs.

Moghaddam, Davood Ghadiri, "Solution-side effectiveness for a liquid-to-air membrane energy exchanger used as a dehumidifier regenerator", Applied Energy, 113, (Jan. 2014), 872-882.

Nobrega,, Carlos Eduardo Leme, Ed, "Desiccant-Assisted Cooling: Fundamentals and Applications", Spring-Verlag London, (2014), 281 pgs.

Pesaran, Ahmad A., "A Review of Desiccant Dehumidification Technology", National Renewable Energy Laboratory, (Oct. 1994), 10 pgs.

(56) References Cited

OTHER PUBLICATIONS

Rowland, Charles A, "Dehumidification Technologies", HPAC Engineering, [Online] Retrieved from the Internet: URL: https:www.hpac.com/humidity-control-article-20925920-dehumidification-technologies, (Mar. 1, 2005), 12 pgs.

Shen, Suping, "Investigation of liquid desiccant regenerator with heat recovery heat pipe system", Energy and Buildings, 146, (Jul. 2017), 353-363.

Shen, Suping, "Hybrid model for heat recovery heat pipe system in Liquid Desiccant Dehumidification System", Applied Energy, 182, (Nov. 2016), 383-393.

Zhang, Li, "Performance analysis of a No. frost hybrid air conditioning system with integrated liquid desiccant dehumidification", Intl. Journal of Refrigeration, 33, (2010), 116-124.

Zhao, Y., "A high performance desiccant dehumidification unit using solid desiccant coated heat exchanger with heat recovery", Energy and Buildings, 116, (Mar. 2016), 583-592.

\* cited by examiner

SYSTEMS AND METHODS FOR AIR DEHUMIDIFICATION IN AN ENCLOSED SPACE

CLAIM OF PRIORITY

This application is a continuation of U.S. patent application Ser. No. 17/311,207, filed on Jun. 4, 2021, which is a U.S. National Stage of PCT Patent Application No. PCT/CA2019/051750, filed on Dec. 4, 2019, which was published on Jun. 11, 2020, as WO 2020/11337 A1, which claims the benefit of U.S. Provisional Patent Application No. 62/775,288, filed on Dec. 4, 2018, the benefit of priority of which are claimed hereby, and which are incorporated by reference herein in their entirety.

TECHNICAL FIELD

The present application relates to systems and methods for providing air dehumidification in an enclosed space. The systems and methods of the present application described herein integrate desiccant dehumidification and heat recovery technologies and can enable a transition between wet and dry modes to efficiently provide dehumidification at various weather conditions.

BACKGROUND

Air dehumidification is needed in most industrial and commercial applications to improve the production processes/quality, restrict microorganism/fungus growth, and improve indoor comfort, etc. Although some dehumidification technologies and products are available in the market, these existing products are designed for 100% outdoor air dehumidification or recirculation air dehumidification only. In point of view of dehumidification, these designs include some unnecessary dehumidification load for the dehumidification unit. In addition, the exhaust air from desiccant regeneration is usually hot/humid and it can be wasteful if exhausted out directly.

OVERVIEW

The present inventors recognize, among other things, an opportunity for improved performance in dehumidifying an enclosed space. By designing a dehumidification system that can operate in multiple modes, the system can operate more efficiently and use dry outdoor air in the winter, and a blend of outdoor air and dehumidified return air in mild conditions. The system can include a dehumidification unit for supply air and a regeneration unit for regenerating dilute desiccant from the dehumidification unit. Waste heat in a heat recovery system can be recovered from either the return air from the enclosed space or the exhaust air exiting the regeneration unit and such waste heat can be used to heat the outdoor air entering into the scavenger air plenum. The source of the waste heat in the heat recovery system can depend on the operating mode of the dehumidification system. Depending on the operating mode, the heated outdoor air can be supplied to the enclosed space or supplied to the regeneration unit.

When the outdoor air is more humid than the return air in summer, return air can be used rather than outdoor air to reduce the dehumidification load. Conversely, when the outdoor air is dry in winter, the outdoor air can be supplied into the enclosed space for partially or fully free dehumidification. The dehumidification component size and capital cost can be reduced accordingly, while the outdoor air ventilation can improve the indoor air quality.

Heat recovery from exhaust air and pre-heating the intake regeneration air can significantly reduce the heating requirement for desiccant regeneration processes and improve the energy efficiency of the dehumidification system. The water vapor in the hot/humid exhaust air may condense during the heat recovery process and the condensate water can be another benefit for some applications where water could be reused, e.g. greenhouses.

Examples according to the present application can include a system for dehumidifying an enclosed space, such as a data center or a greenhouse. The system can comprise a supply plenum for directing return air from the enclosed space through the supply plenum, a scavenger plenum for directing outdoor air through the scavenger plenum, a dehumidification unit arranged in the supply plenum to remove water vapor from the return air using a desiccant, a regeneration unit arranged in the scavenger plenum to concentrate a dilute desiccant from the dehumidification unit, and a heat recovery system to heat the outdoor air in the scavenger plenum. The system can operate in multiple modes, including a wet mode in which the dehumidification unit and regeneration unit are operational and a dry mode in which the dehumidification LAMEE and regeneration unit are off or bypassed. Selection of the mode can depend on at least one of outdoor air conditions and a setpoint for the air in the enclosed space.

The dehumidification system can maximize the use of dry outdoor air and can operate more efficiently in winter. In an example, the dehumidification unit can include a dehumidifier liquid to air membrane energy exchanger (LAMEE). The regeneration unit can include any type of thermal regeneration process. In an example, the regeneration unit can include a regeneration LAMEE. The supply and scavenger plenums can be arranged side by side or top and bottom. In an example, one or both of the supply and scavenger plenums can have a folded design such that the air enters the plenum at one end and exits the plenum at the same end, with the air turning at the other end of the plenum. Such folded design can reduce an overall length of the system.

The heat recovery system can utilize waste heat differently depending on the operating mode of the dehumidification system. In the wet mode, the waste heat can be scavenger air exiting the regeneration unit and the waste heat can be used to heat the outdoor air before it enters the regeneration unit. In the dry mode, the waste heat can be supply exhaust air and the waste heat can be used to heat the outdoor air before it is supplied to the enclosed space. In an example, the heat recovery system is a glycol run around loop. Other types of heat recovery systems, such as a heat pipe or a heat wheel, can be used in the dehumidification system.

The dehumidification system can include a controller that operates the system in the multiple modes and selection of the mode can be a function of the outdoor air conditions and a relative humidity (RH) of air in the enclosed space. The system can include one or more dampers for controlling the flow of air through the supply and scavenger plenums. The one or more dampers can include a dehumidifier damper configured to prevent or permit return air from flowing through the dehumidification LAMEE, and a first redirect damper configured to prevent or permit return air from flowing from the supply plenum into the scavenger plenum and out the exhaust air outlet. The one or more dampers can include a regeneration damper configured to prevent or permit outdoor air from flowing through the regeneration unit, and a second redirect damper configured to prevent or permit outdoor air from flowing from the scavenger plenum into the supply plenum and out the supply air outlet.

Examples according to the present application can include a system for dehumidifying an enclosed space, the system having a return air plenum configured to direct air from the enclosed space in a first air flow path from a return air inlet to a supply air outlet, a scavenger air plenum direct outdoor air in a second air flow path from a scavenger air inlet to an exhaust air outlet, a dehumidification unit arranged inside the return air plenum to selectively circulate a desiccant through the first desiccant flow path and remove water from the air in the first air flow path, a regeneration unit arranged inside the scavenger air plenum to selectively circulate the desiccant through the regeneration unit and remove water from the desiccant to the air in the second air flow path, and a controller configured to operate the system in a plurality of operating modes based on conditions of the outdoor air and one or more setpoint parameters for air in the enclosed space. The plurality of operating modes can include a wet mode in which the dehumidification unit and the regeneration unit are both operational to dehumidify the return air and regenerate the dilute desiccant, and supply air to the enclosed space is dehumidified return air. The plurality of operating modes can include a blended mode in which the dehumidification unit and the regeneration unit are both operational to dehumidify the return air and regenerate the dilute desiccant, and supply air to the enclosed space is a mixture of dehumidified return air and outdoor air. The plurality of operating modes can include a dry mode in which both the dehumidification unit and the regeneration unit are off or bypassed, and supply air to the enclosed space is outdoor air.

Examples according to the present application can include a method of providing dehumidification to an enclosed space using a dehumidification system. The method can include directing return air from the enclosed space through a supply plenum, selectively directing the return air through a dehumidification LAMEE arranged inside the supply plenum to dehumidify the return air, directing outdoor air through a scavenger plenum, selectively directing dilute desiccant through a regeneration unit arranged inside the scavenger plenum to regenerate the dilute desiccant from the dehumidification unit, and operating the dehumidification system in multiple modes. The mode can be selected based on outdoor air conditions and a setpoint for air in the enclosed space. The method can further include selectively redirecting at least a portion of the return air in the supply plenum into the scavenger plenum as a function of the selected mode, selectively redirecting at least a portion of the outdoor air in the scavenger plenum into the supply plenum as a function of the selected mode, and heating the outdoor air in the scavenger plenum upstream of the regeneration unit using waste heat. The waste heat can be either exhaust scavenger air or exhaust return air, depending on the selected mode.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A dehumidification system, which integrates liquid desiccant dehumidification and heat recovery technologies, is described herein. The dehumidification system can be used in a greenhouse application, where dehumidification is required through the whole year and indoor temperature is controlled by another system. The dehumidification system can also be extended to industrial, commercial and residential applications with dehumidification requirements. In an example, the dehumidification system can be used for a natatorium. In another example, the dehumidification system can be used for a data center, in particular a data center installed in a humid climate.

The dehumidification system can be operated under different modes to maximize use of free, dry outdoor air, and hence efficiently provide dehumidification at various outdoor weather conditions. In an example, the dehumidification system can operate in two modes—a wet mode and a dry mode. In an example, the dehumidification system can operate in three modes—a wet mode, blended mode, and dry mode.

Figure 1A:
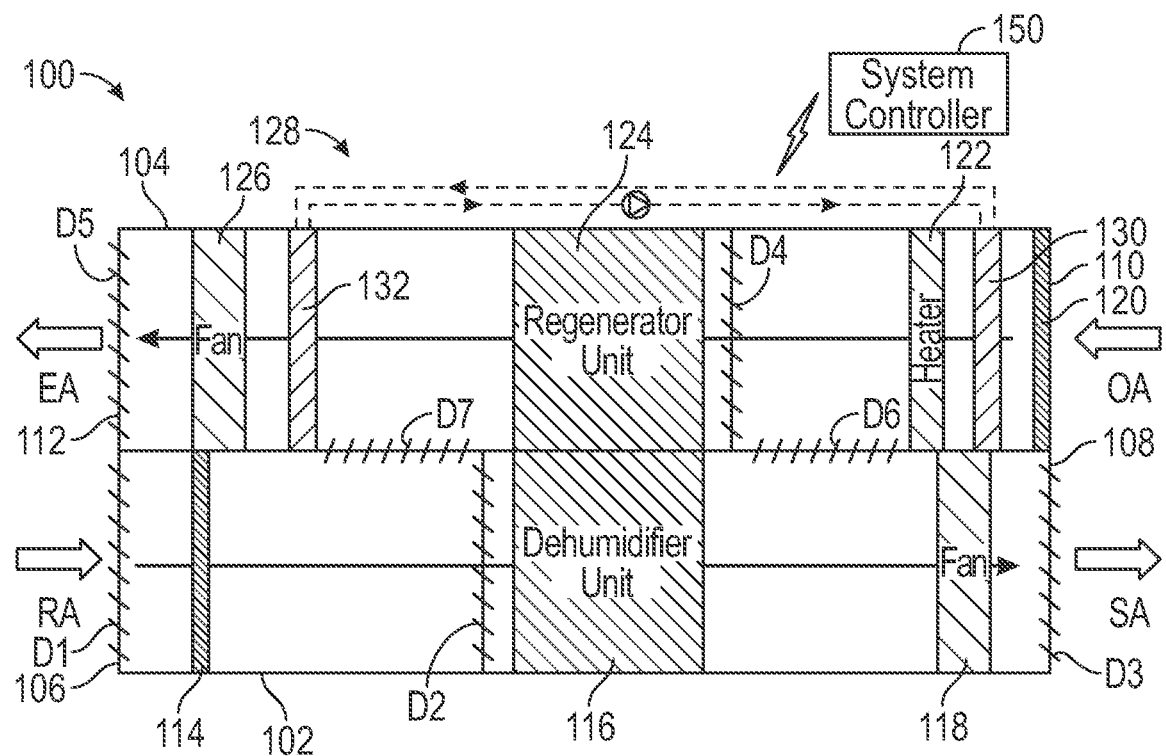
FIGS. 1A-1C are schematics of an example dehumidification system for dehumidifying an enclosed space under different operating modes, in accordance with the present patent application.
Figure 1B:
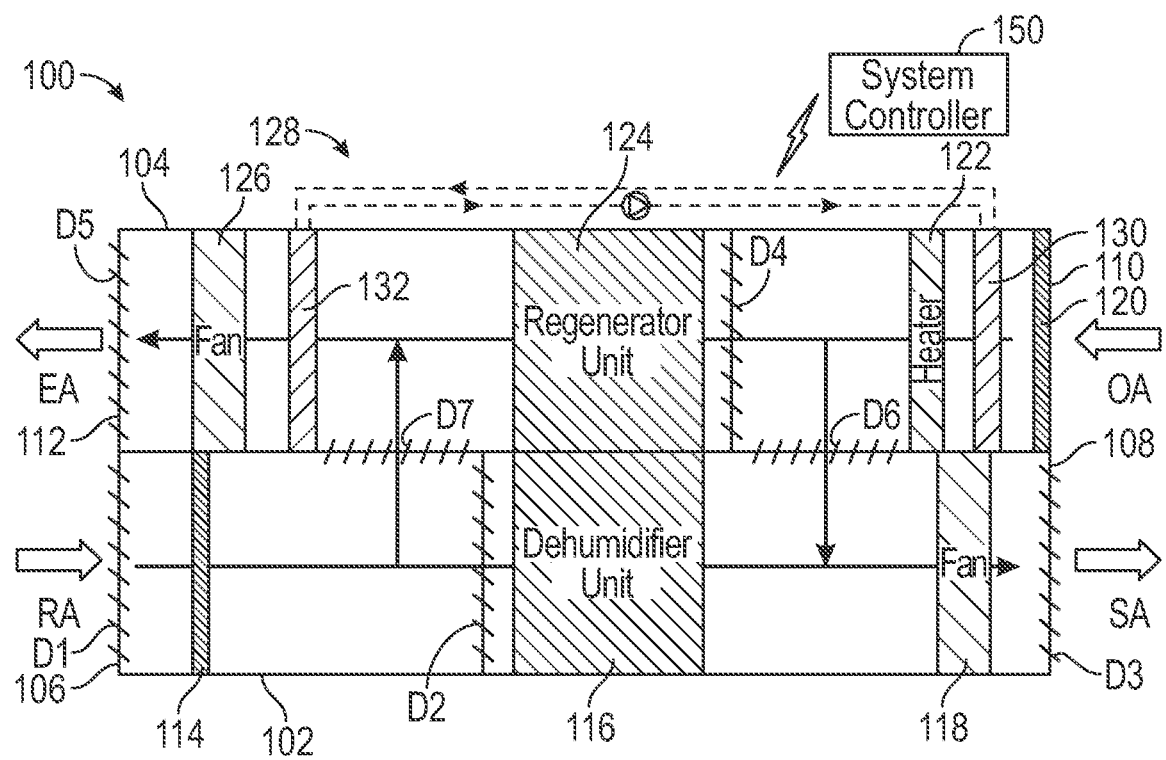
Figure 1C:
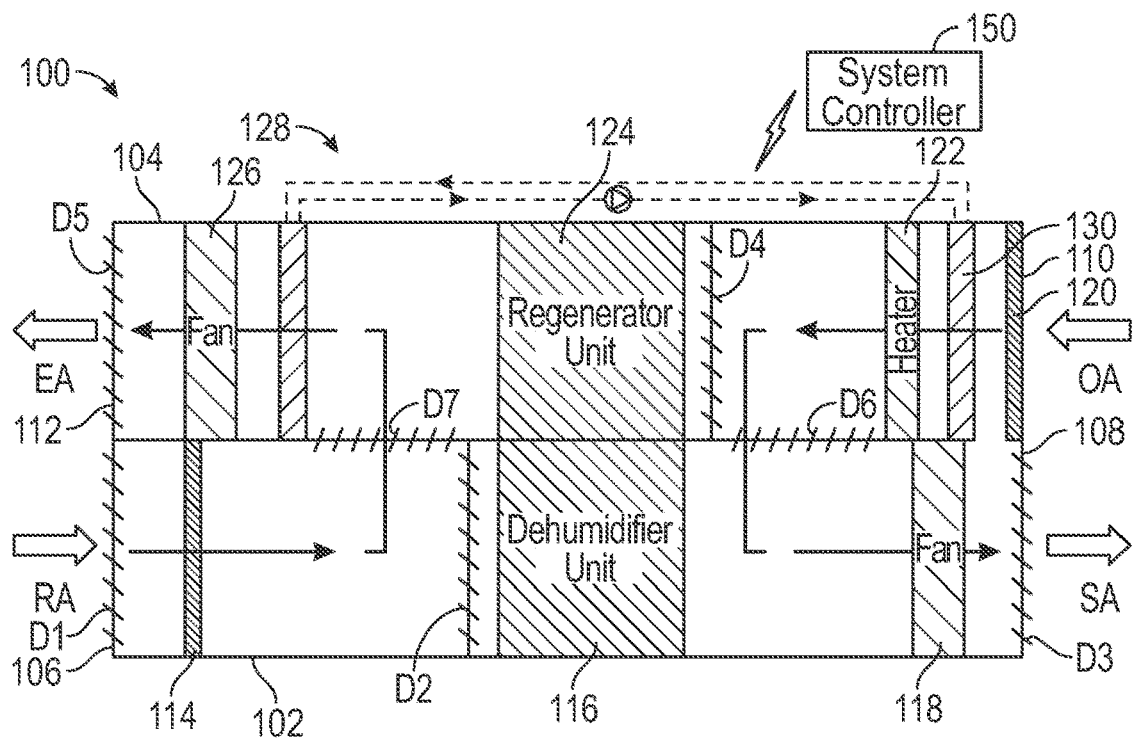

FIGS. 1A-1C show the top-view schematics of an example of a dehumidification system 100 under three main operating modes of the system 100—dry mode, wet mode, and blended mode. The components of the dehumidification system 100 are first described in reference to FIG. 1A and then the three operating modes are described in reference to each of FIGS. 1A, 1B and 1C.

In an example, the dehumidification system 100 can be a two-level unit comprising a supply plenum 102 on a bottom level of the system 100 and a scavenger plenum 104 on a top level of the system 100. In an example, the dehumidification system 100 can be a side by side unit. The supply plenum 102 (or process plenum) can receive humid air/return air (RA) at a supply inlet 106 and discharge dry supply air (SA) at a supply outlet 108. The scavenger plenum 104 can receive outdoor air (OA) or scavenger air at a scavenger inlet 110 and discharge exhaust air (EA) at a scavenger outlet 112. The supply plenum 102 can include a filter 114, an air/ desiccant energy exchanger (i.e. a dehumidifier liquid-to-air membrane energy exchanger (LAMEE)) or dehumidification unit 116, and a fan 118 near the supply outlet 108. The scavenger plenum 104 can include a filter 120, a heater 122, a regeneration unit 124, a fan 126 and a heat recovery system 128. In an example shown in FIG. 1A, the heat recovery system 128 can include a first air coil 130 upstream of the regeneration unit 124 and a second air coil 132 downstream of the regeneration unit 124, the first and second air coils 130, 132 being fluidly connected. The heat recovery system 128 of FIG. 1A can be a glycol run around loop configured to operate in two ways depending on an operating mode of the system 100, as described below. The heat recovery system 128 can use waste heat from either return air in the supply air plenum or exhaust air downstream of the regeneration unit in the scavenger air plenum. It is recognized that each of fans 118 and 126 can include a plurality of fans.

The dehumidification system 100 can include one or more sets of dampers to facilitate operation of the system 100 in multiple modes. A first damper D1 can be located at the supply inlet 106 of the supply plenum 102. A second damper D2 can be located in the supply plenum 102 upstream of the dehumidification unit 116. A third damper D3 can be located at the supply outlet 108 of the supply plenum 102. A fourth damper D4 can be located in the scavenger plenum 104 upstream of the regeneration unit 124. A fifth damper D5 can be located at the scavenger outlet 112 of the scavenger plenum 104. A sixth damper D6 can be located between the supply plenum 102 and scavenger plenum 104 upstream of the regeneration unit 124. A seventh damper D7 can be located between the supply plenum 102 and scavenger plenum 104 upstream of the dehumidification unit 116. The modes of operation can be controlled by regulating the dampers D1-D7. The dehumidification system 100 can comprise a system controller 150 to control operation of the dehumidification system 100 and control an amount of dehumidification provided to the supply air for the enclosed space. In an example, the system 100 can be controlled such that a relative humidity (RH) of the air in the enclosed space is equal to a set point that can be constant or variable.

In an example, the dehumidification unit 116 can be a dehumidification LAMEE. In an example, the regeneration unit 124 can be a regenerator LAMEE. In such an example, the dehumidifier LAMEE can also be referred to herein as a first LAMEE and the regenerator LAMEE can also be referred to herein as a second LAMEE. It is recognized that other types of dehumidification units can be used in the system 100 in place of a dehumidifier LAMEE—see, for example, FIGS. 6 and 7. The dehumidifier LAMEE can offer advantages, relative to other types of dehumidification units, in operation of the system 100 as described below. The regeneration unit 124 can include any type of thermal regeneration system, examples of which are included below—see, for example, FIGS. 6 and 7.

A liquid to air membrane energy exchanger (LAMEE) can be used as part of an air conditioning system (or energy exchange system) to transfer heat and moisture between a liquid desiccant and an air stream to condition the temperature and humidity of the air flowing through the LAMEE. The membrane in the LAMEE can be a non-porous film having selective permeability for water, but not for other constituents that form the liquid desiccant. Many different types of liquid desiccants can be used in combination with the non-porous membrane, including, for example, glycols. The non-porous membrane can make it feasible to use desiccants, such as glycols, that had been previously determined to be unacceptable or undesirable in these types of applications. In an example, the membrane in the LAMEE can be semi-permeable or vapor permeable, and generally anything in a gas phase can pass through the membrane and generally anything in a liquid phase cannot pass through the membrane. In an example, the membrane in the LAMEE can be micro-porous such that one or more gases can pass through the membrane. In an example, the membrane can be a selectively-permeable membrane such that some constituents, but not others, can pass through the membrane.

In an example, the LAMEE can use a flexible polymer membrane, which is vapor permeable, to separate air and water. Relative to other systems/devices, the water flow rate and air flow rate through the LAMEE may not be limited by concerns such as droplet carryover at high face velocities. In addition, the LAMEE can operate with water flow rates that enable the transport of thermal energy into the cooler similar to a cooling tower, and the elevated inlet water temperatures can boost the evaporative cooling power of the LAMEE.

The dehumidifier LAMEE can circulate any type of liquid desiccant suitable for removing moisture from the air. In an example, the cooling fluid is a liquid desiccant that is a high concentration salt solution. The presence of salt can sanitize the cooling fluid to prevent microbial growth. In addition, the desiccant salt can affect the vapor pressure of the solution and allow the cooling fluid to either release or absorb moisture from the air. Examples of salt-based desiccants usable herein include lithium chloride, magnesium chloride, calcium chloride, lithium bromide, lithium iodide, potassium fluoride, zinc bromide, zinc iodide, calcium bromide, sodium iodide and sodium bromide. In an example, the liquid desiccant can include an acetate salt, such as, but not limited to, an aqueous potassium acetate and an aqueous sodium acetate.

In an example, the liquid desiccant can include a glycol or glycol-water solution. Glycols can be unsuitable for use in a direct contact exchanger because the glycol can evaporate into the air stream. A glycol based liquid desiccant can be used here with a non-porous membrane since the membrane is vapor permeable but can prevent the transfer of the glycol into the air. In an example, the liquid desiccant can include glycols, or glycol-based solutions, such as triethylene glycol and propylene glycol, which are non-toxic, compatible with most metals and comparatively low in cost. Glycols can be strongly hygroscopic at higher concentrations. For example, a 95% solution of triethylene glycol has a comparable drying/dehumidification potential to lithium chloride near saturation. Triethylene glycol and tripropylene glycol can have low vapor pressures, but can be expensive. Less expensive and higher vapor pressure glycols, such as ethylene glycol, diethylene glycol, propylene glycol and dipropylene glycol, can be used herein.

Other examples of liquid desiccants usable in the dehumidifier LAMEE described herein include, but are not limited to, hygroscopic polyol-based solutions, sulfuric acid and phosphoric acid. Glycerol is an example of a hygroscopic polyol usable herein. It is recognized that mixtures of desiccants can be used as the liquid desiccant in the dehumidifier LAMEE described herein. In addition to the desiccants listed above, the liquid desiccant can include, but is not limited to, an acetate salt solution, a halide salt solution, a hygroscopic polyol based solution, a glycol based solution, a sulfuric acid solution, a phosphoric acid solution, and any combinations thereof.

The use of a LAMEE in a dehumidification system can offer advantages. For example, the membrane separation layer in the LAMEE can reduce maintenance, eliminate the requirement for chemical treatments, and can reduce the potential for contaminant transfer to the liquid loop. The membrane barriers of the LAMEE inhibit or prohibit the transfer of contaminants and micro-organisms between the air and the liquid stream, as well as inhibiting or prohibiting the transfer of solids between the water and air.

In the example in which the regeneration unit 124 is a regenerator LAMEE, the regenerator LAMEE can be configured to regenerate the desiccant solution used in the dehumidification LAMEE/dehumidification unit 116 with the scavenger air. A part of the diluted desiccant solution in the dehumidification tank (see FIG. 2) can be transferred to the regeneration tank (see FIG. 2). The liquid desiccant can be heated by a heater to increase its temperature and partial water vapor pressure during the regeneration process. When the scavenger air, with a lower water vapor pressure, passes through the regenerator LAMEE, the moisture transfers through the membrane from the desiccant solution to the scavenger air. The mass or moisture transfer direction in the regeneration process is converse to the dehumidification process. The desiccant solution is consequently concentrated in the regenerator LAMEE. The scavenger air can be heated as well to enhance the moisture transfer and improve the regeneration process.

The dehumidification system 100 can operate in a plurality of modes. In an example, the dehumidification system 100 can operate in a wet mode, blended mode and dry mode, each of which is described below.

Wet mode: FIG. 1A illustrates operation of the dehumidification system 100 in the wet mode, which is suitable when the outdoor air humidity is higher than return air from the enclosed space. In the wet mode, dampers D6 and D7 can be fully closed such that outdoor scavenger air can remain in the scavenger plenum 104 and return/supply air can remain in the supply plenum 102. Dampers D1-D5 can be fully open. Return air (RA) from the enclosed space can be dehumidified by the dehumidification unit 116. Dilute desiccant from the dehumidification unit 116 can be regenerated in the regeneration unit 124. In the wet mode, dehumidifier and regenerator units 116, 124 are operational for air dehumidification and solution regeneration, respectively. The heat recovery system 128, shown as a glycol run-around loop in the example of FIGS. 1A-1C, can recover heat from the hot exhaust air (EA) and preheat the outdoor air (OA) prior to entering into the regeneration unit 124, in order to reduce the heating requirement for the solution regeneration process. This mode is suitable when the outdoor air humidity is higher than return air (RA).

Blended mode: FIG. 1B illustrates operation of the dehumidification system 100 in the blended mode, which is suitable during mild outdoor air conditions, such as in the spring or fall. In the blended mode, dampers D6 and D7 can be partially or fully open. Dampers D1, D3 and D5 can be fully open. Dampers D2 and D4 can be fully or partially open. A portion of the return air (RA) entering into the supply plenum 102 can be dehumidified by the dehumidification unit 116 and mixed with a portion of outdoor air (OA) from the scavenger plenum 104, which can enter the supply plenum 102 via damper D6. The mixture of dehumidified return air and outdoor air can be supplied to the enclosed space for dehumidification. A portion of the outdoor air entering into the scavenger plenum 104 can pass through the regeneration unit 124 and then mix with return air which can enter the scavenger plenum 104 via damper D7. The mixture of outdoor air and return air can exit the scavenger plenum 104 as exhaust at the scavenger outlet 112. The blended mode can be suitable when the outdoor air is mild—the outdoor air is drier than the return air (RA), but active dehumidification is still required in order to be equal to or near the relative humidity set point for the enclosed space.

In the blended mode, a position of one or more of the dampers can vary during operation of the system, based in part on changing outdoor air conditions. The system controller 150 can control and vary the blend of outdoor air and return air delivered to the enclosed space. In an example, dampers D2 and D7 can be interlocked, and dampers D4 and D6 can be interlocked. If there is a decrease in the outdoor air humidity, dampers D4 and D2 can be partially closed, while dampers D6 and D7 can be partially open. Because damper D4 is located in proximity to the regenerator unit 124 and controls a flow of air into the regeneration unit 124, damper D4 can be referred to herein as a regeneration damper. Because damper D2 is located in proximity to the dehumidification unit 116 and controls a flow of air into the dehumidification unit 116, damper D2 can be referred to herein as a dehumidification damper. Dampers D6 and D7 can be used to redirect air from one plenum into the other plenum and thus dampers D6 and D7 can be referred to herein as redirect dampers.

Dry mode: FIG. 1C illustrates operation of the dehumidification system 100 in the dry mode, which is suitable when the outdoor air is dry and at a low temperature, such as in the winter. In the dry mode, dampers D2 and D4 can be fully closed. Dampers D1, D3, D5, D6, D7 can be fully open. Dry outdoor air can be used for fully free dehumidification. Both the dehumidifier unit 116 and the regeneration unit 124 can be off. The heat recovery system/glycol run-around loop 128 can be used to recover heat from the warm return air (RA) that passes through damper D7 and then through the second coil 132 before exiting the scavenger plenum 104 as exhaust. Since the first coil 130 is part of the glycol run-around loop 128, the warm return air can thus be used to preheat the outdoor air (OA) (via the first coil 130) to be delivered to the enclosed space, in order to keep the supply air (SA) temperature within an acceptable range. In this mode, the glycol run-around loop 128 can operate as a conventional heat recovery ventilation (HRV) system.

Of significance in the design of the dehumidification system 100 is the ability to operate the glycol run around loop 128 in two different ways, each of which is unique to either the dry mode or wet mode. Simulation results show that about 28 percent more condensate water can be recovered by the glycol run-around loop 128 when the dehumidification system runs at the dry mode in the winter.

The dry mode can be more energy efficient than the wet mode in winter. Simulation results show that the overall energy consumption (fan power, pump power, heating requirement) of the dehumidification system 100 in the dry mode is up to about 34 percent lower than the dehumidification system 100 at the wet mode in winter. The dehumidification system 100 can reduce the number of hours the system 100 operates in the wet mode and thus increase the lifespan of the dehumidification unit 116 and the regeneration unit 124.

The dampers D1, D3 and D5 can function to seal off plenums 102 and 104. Although shown in FIGS. 1A-1C, it is recognized that one or more of dampers D1, D3 and D5 can be excluded in other examples of a dehumidification system.

The system controller 150 can be configured to operate the dehumidification system in the modes described above. The system controller 150 can be manual or automated, or a combination of both. In an example, the dehumidification system can be controlled to operate at or near a target relative humidity (RH) setpoint inside a building. The damper positions are determined by operating modes and the outdoor air humidity, and the fan speed or supply air flow rate can be regulated to achieve the RH setpoint.

The system controller 150 can include hardware, software, and combinations thereof to implement the functions attributed to the controller herein. The system controller 150 can be an analog, digital, or combination analog and digital controller including a number of components. As examples, the controller 150 can include ICB(s), PCB(s), processor(s), data storage devices, switches, relays, etcetera. Examples of processors can include any one or more of a microprocessor, a controller, a digital signal processor (DSP), an application specific integrated circuit (ASIC), a field-programmable gate array (FPGA), or equivalent discrete or integrated logic circuitry.

The system controller 150 can be configured to communicate with the dehumidification system and components thereof via various wired or wireless communications technologies and components using various public and/or proprietary standards and/or protocols. The system controller 150 can include one or more programs, circuits, algorithms or other mechanisms for controlling the operation of the dehumidification system. For example, the system controller 150 can be configured to modulate the speed of one or more fans inside the unit and/or control actuation of one or more dampers or valves inside the unit.

Figure 8:
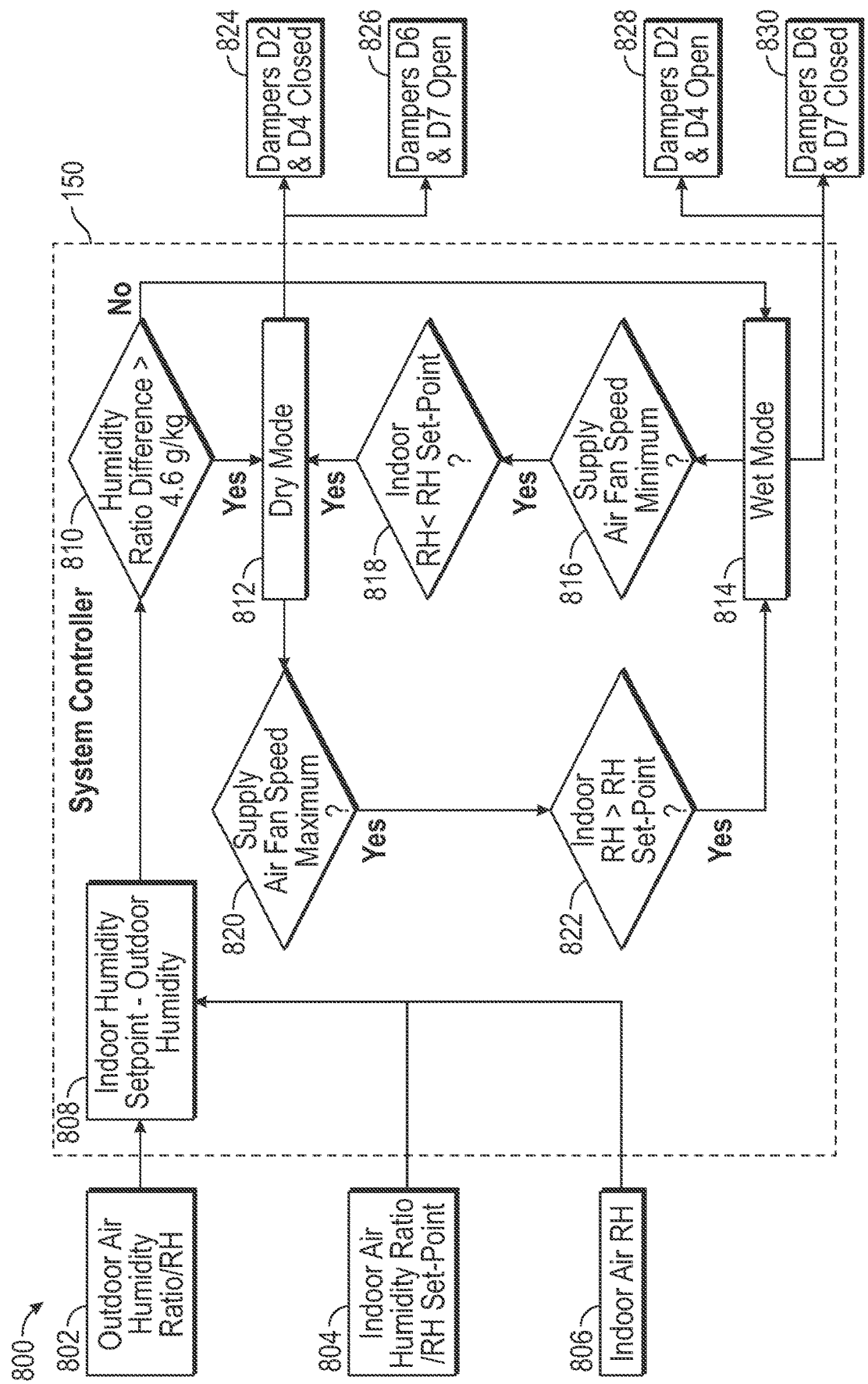
FIG. 8 is a flow chart of an example control system for operating a dehumidification system, in accordance with the present patent application.

An example of the control logic for the system controller 150 is shown in FIG. 8 and described below.

Figure 2:
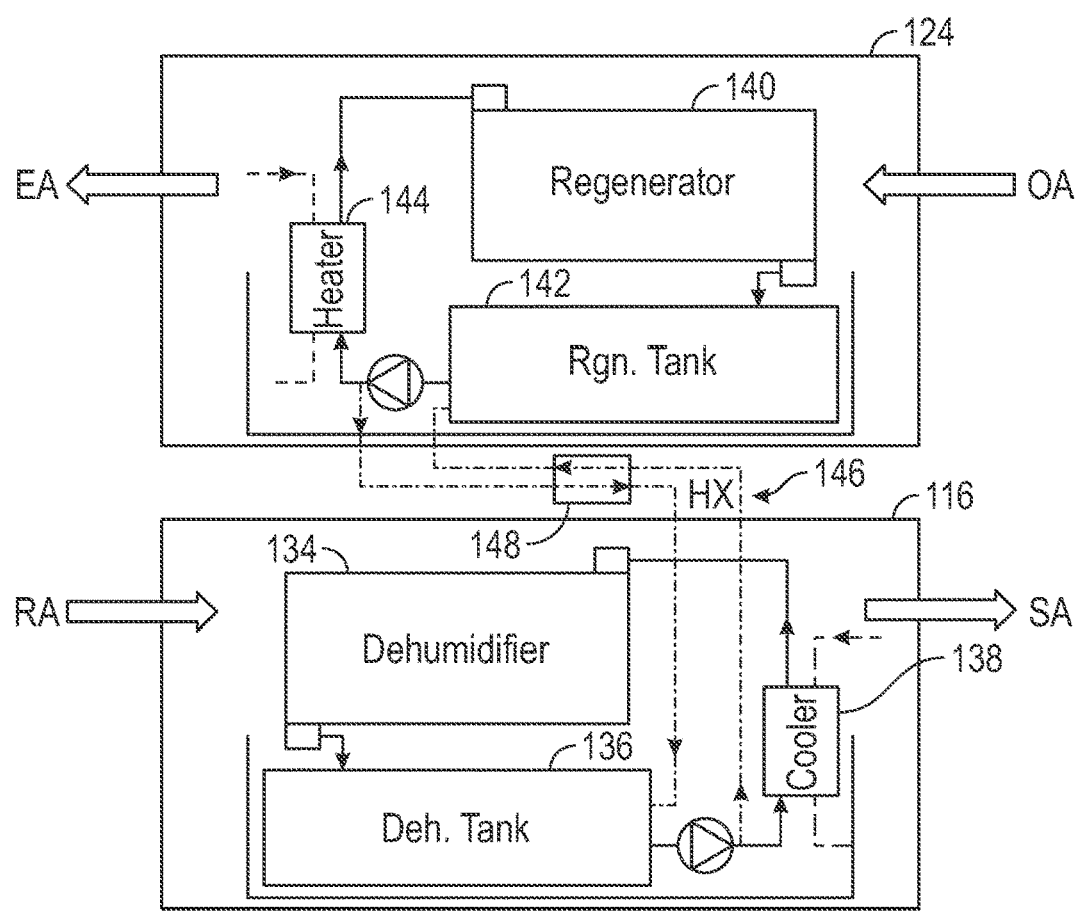
FIG. 2 is a schematic of the dehumidification and regeneration units of the system in FIGS. 1A-1C.

FIG. 2 shows a side view of the dehumidifier unit 116 and regeneration unit 124 of FIGS. 1A-1C. The dehumidification unit 116 can include a dehumidifier 134 (which in an example can be a dehumidification LAMEE 134), a dehumidifier tank 136, and a cooler 138. The regeneration unit 124 can include a regenerator 140, a regenerator tank 142, and a heater 144.

The return air in the supply plenum 102 can be dehumidified by the dehumidifier LAMEE 134 and then supplied to the conditioned space (for example, a greenhouse or a data center). Water vapor in the air stream can be absorbed by the liquid desiccant circulating through the dehumidifier LAMEE 134 and thereby the solution in the dehumidifier tank 136 can become diluted. In the air dehumidification process, the liquid desiccant solution can circulate at an adiabatic condition (without cooler) or can be cooled by the cooler 138 before it is supplied into the dehumidifier LAMEE 134. The cooler 138 can be supplied by a low grade cooling source, such as a cooling tower or other renewable or recyclable energy sources, to booster dehumidification capacity of the system 100.

On the regenerator side, outdoor air in the scavenger plenum 104 can be used to regenerate/concentrate the diluted solution transferred from the dehumidifier tank 136 to the regenerator tank 142. Water is evaporated in the regenerator 140 and taken away by the outdoor regeneration air, which is exhausted at the scavenger outlet 112, and the solution concentration in the regenerator tank 142 can be kept in the designed range. During the solution regeneration process, the liquid desiccant solution may or may not need to be heated by a heater 144 before it is supplied into the regenerator 140. The liquid desiccant solution can circulate through the regenerator 140 at an adiabatic condition (without the heater 144) or heated by the heater 144. The heat for the heater 144 can be supplied by an electrical heater, a heat pump or other renewable or recyclable energy sources.

A solution interchange loop/circuit 146 is shown in FIG. 2 to transfer the liquid desiccant between the dehumidifier tank 136 (with diluted solution) and the regenerator tank 142 (with concentrated solution). One or more ON/OFF modulating valves can be installed in the loop 146 to control the start or stop of desiccant solution transfer. The solution concentration and level in the dehumidifier tank 136 can be maintained at designed ranges by solution transferring. An optional solution-to-solution heat exchanger 148 can be installed in the solution interchange loop 146 to reduce the cooler 138 or heater 144 sizes and cooling/heating consumption of the system 100 under the blended and wet modes.

In addition to the normal solution regeneration process, the regeneration capacity of the system 100 can be maximized during off-peak periods (for example, during the night), to maximize use of the drier outdoor air and potentially cheaper electricity. Thus, the desiccant can be concentrated during the night or other periods when the outdoor air is dry. The concentrated desiccant can be stored in the regenerator tank 142 and utilized the following day during the blended and wet operating modes.

Figure 3:
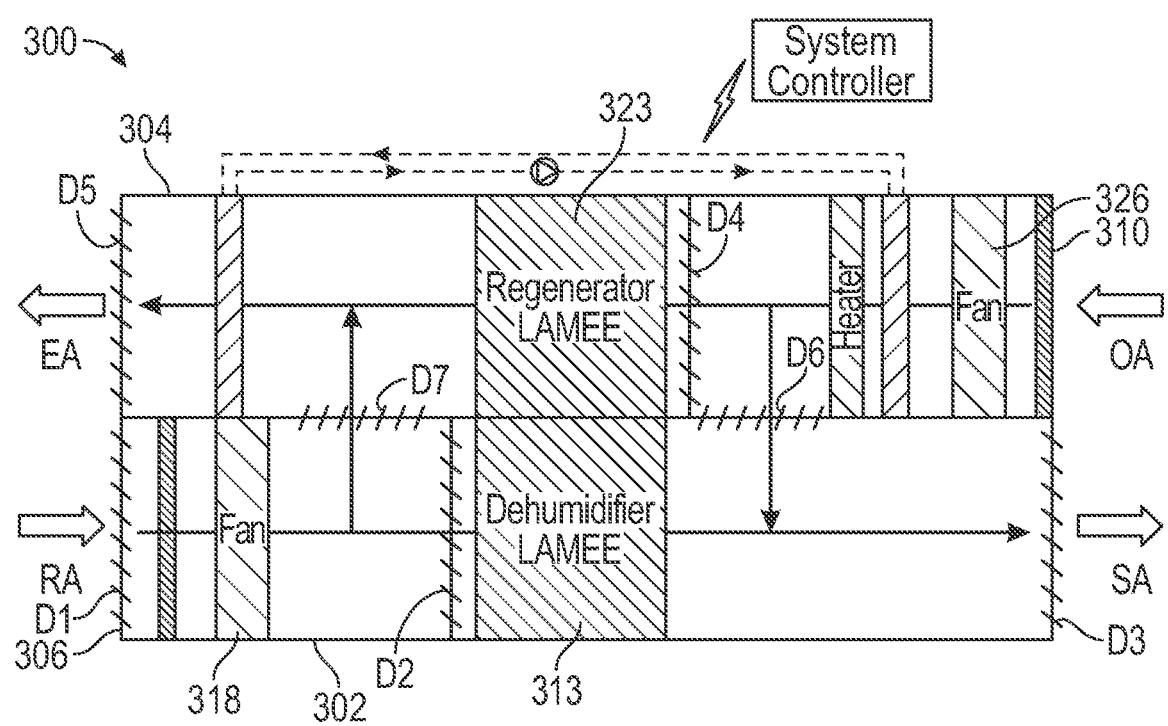
FIG. 3 is a schematic of an example dehumidification system in accordance with the present patent application.

In addition to or as an alternative to the cabinet design of the system 100 shown in FIGS. 1A-1C, it is recognized that other configurations of the dehumidification system can be used. FIG. 3 shows a dehumidification system 300 that is similar to the dehumidification system 100 but with a rearrangement of fans 318 and 326 in the dehumidification system 300. Instead of the fans 318 and 326 being at the outlets 308, 312 of the plenums 302, 304 (as in FIGS. 1A-1C), the fans 318, 326 are moved to be closer to the inlets 306, 310 of the plenums 302, 304. FIG. 3 shows the airflow through the dehumidification system 300 in the blended mode. In the example shown in FIG. 3, the dehumidification unit is a dehumidification LAMEE 313 and the regeneration unit is a regenerator LAMEE 323.

Figure 4A:
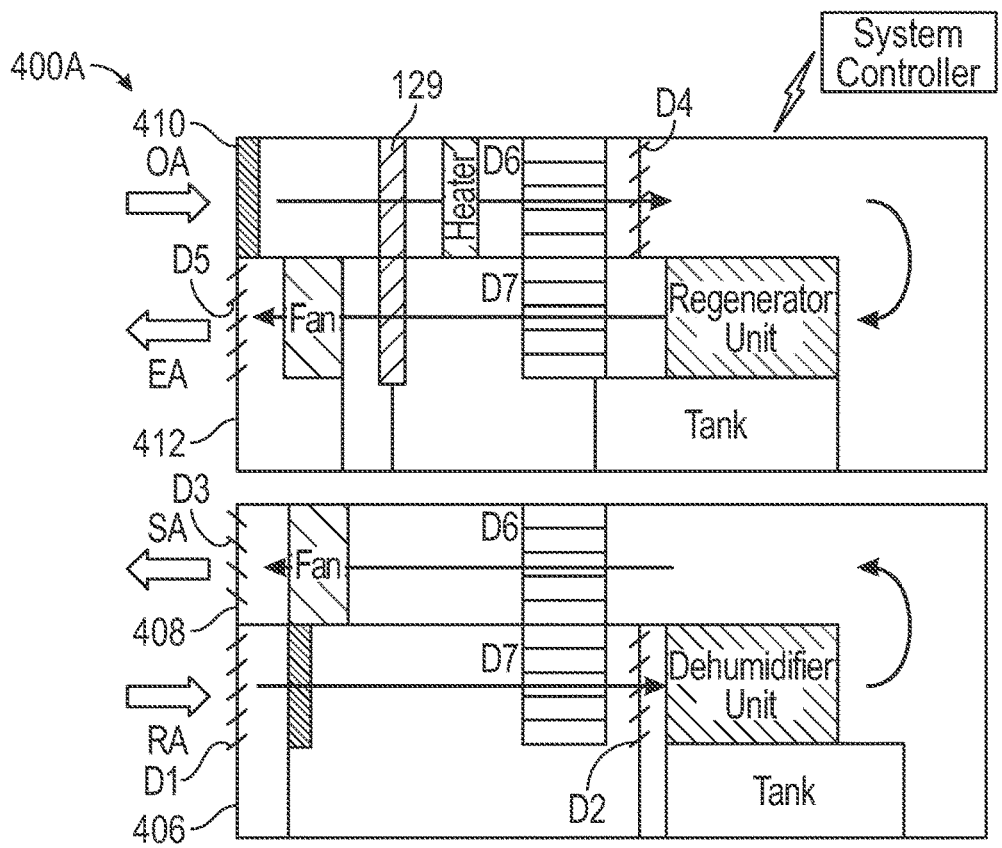
FIGS. 4A and 4B are schematics of example dehumidification systems in accordance with the present patent application.
Figure 4B:
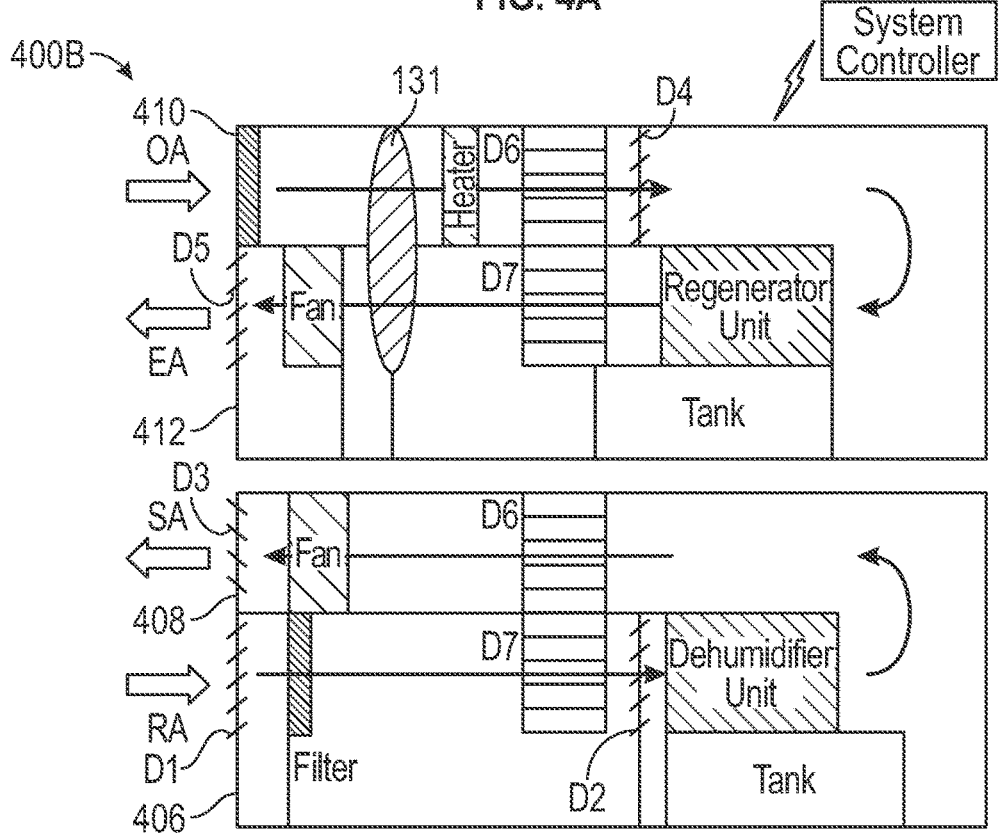

FIGS. 4A and 4B show dehumidification systems 400A and 400B that are similar to the systems 100 and 300 but with a folded design of the dehumidification system. In this design, the inlet regeneration air flow and exhaust air flow are adjacent at the regeneration side/channel. The layout in FIGS. 4A and 4B, as well as FIGS. 5A and 5B described below, of a folded design can facilitate use of other heat recovery technologies, such as, for example, a heat pipe 129 in FIG. 4A and a heat wheel 131 in FIG. 4B, in addition to or as an alternative to the run-around loop 128. The overall length of the dehumidification systems 400A and 400B can be shorter, relative to the dehumidification systems 100 and 300, and hence can reduce the footprint of the system.

Figure 5A:
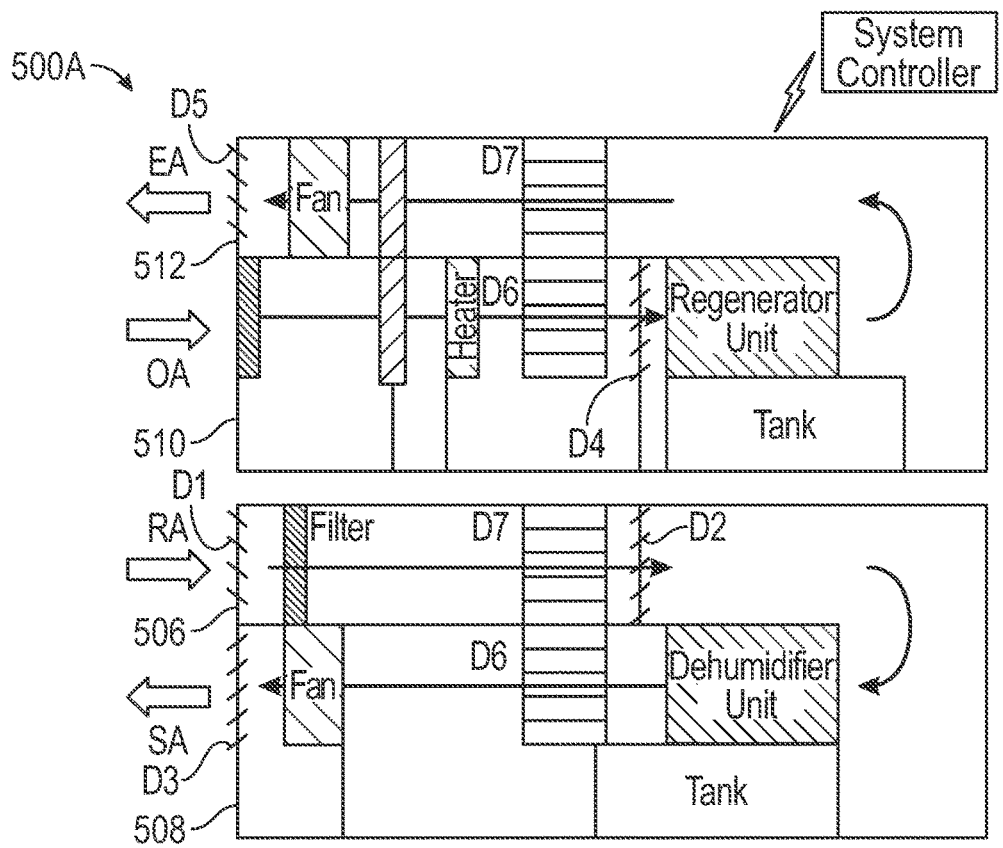
FIGS. 5A and 5B are schematics of example dehumidification systems in accordance with the present patent application.
Figure 5B:
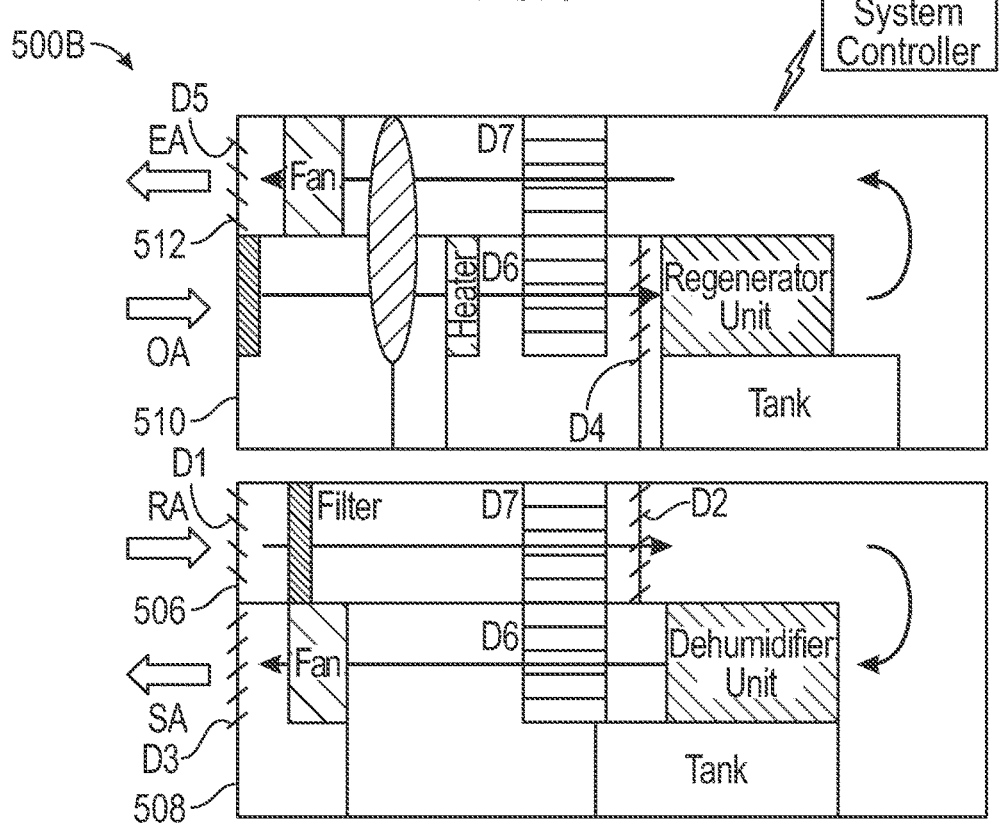

FIGS. 5A and 5B show other examples of dehumidification systems 500A and 500B having a folded design. Compared with the design in FIGS. 4A and 4B, the air flow directions in the systems 500A and 500B are changed. For instance, as shown in FIG. 5A, the outdoor air (OA) can be taken into the system 500 from the bottom at a scavenger inlet 510 and exhausted at the top in the regeneration side at a scavenger outlet 512. In contrast, in FIG. 4A, the outdoor air (OA) can be taken into the unit from the top at the scavenger inlet 410 and exhausted at the bottom at the scavenger outlet 412. The design in FIGS. 5A and 5B may reduce the potential recirculation of the exhaust air back to the intake, since such exhaust air is hot after liquid desiccant regeneration.

Figure 6:
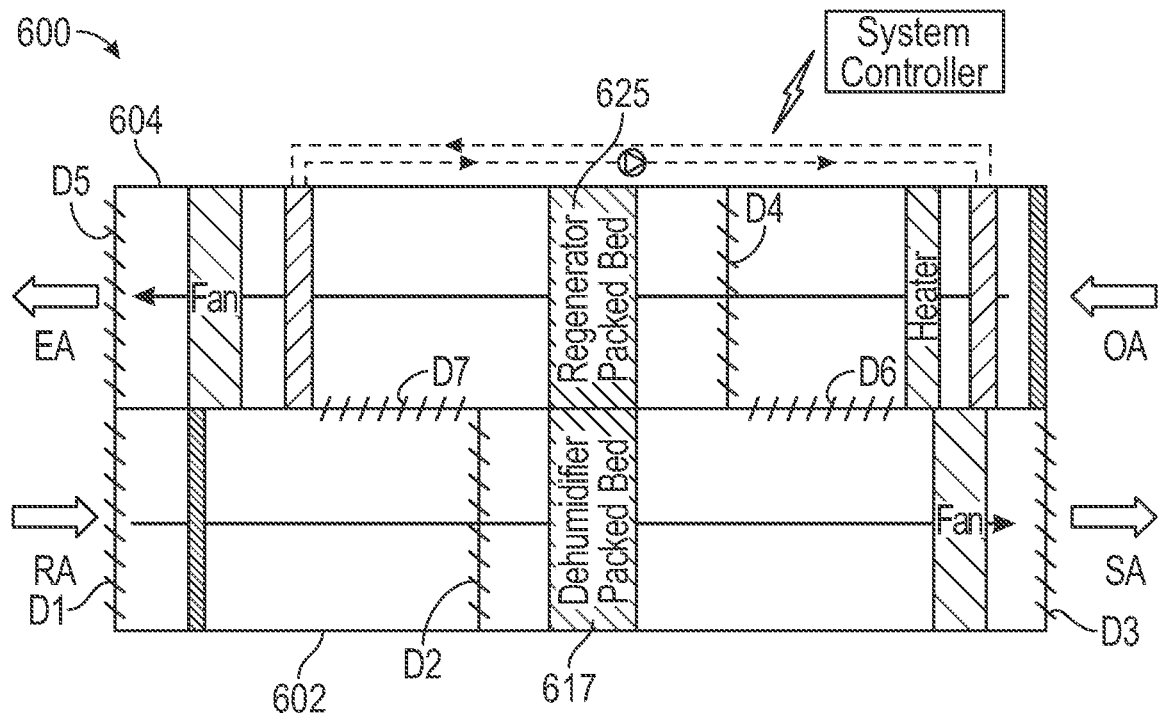
FIG. 6 is a schematic of an example dehumidification system in accordance with the present patent application.

FIG. 6 is an example of a dehumidification system 600 with direct-contact air/liquid desiccant exchangers (such as, for example, liquid desiccant packed beds/towers with structured or unstructured packings), shown as a dehumidifier packed bed 617 in a supply plenum 602 and a regenerator packed bed 625 in a scavenger plenum 604. In another example, other indirect contact air/liquid desiccant exchangers (such as, for example, membrane based hollow fiber or fiber tube exchangers) can be used as an alternative to the dehumidification and regeneration units described above. Similarly, the direct-contact or indirect-contact air/liquid desiccant exchangers can also be used in the folded designs of the dehumidification system.

Figure 7:
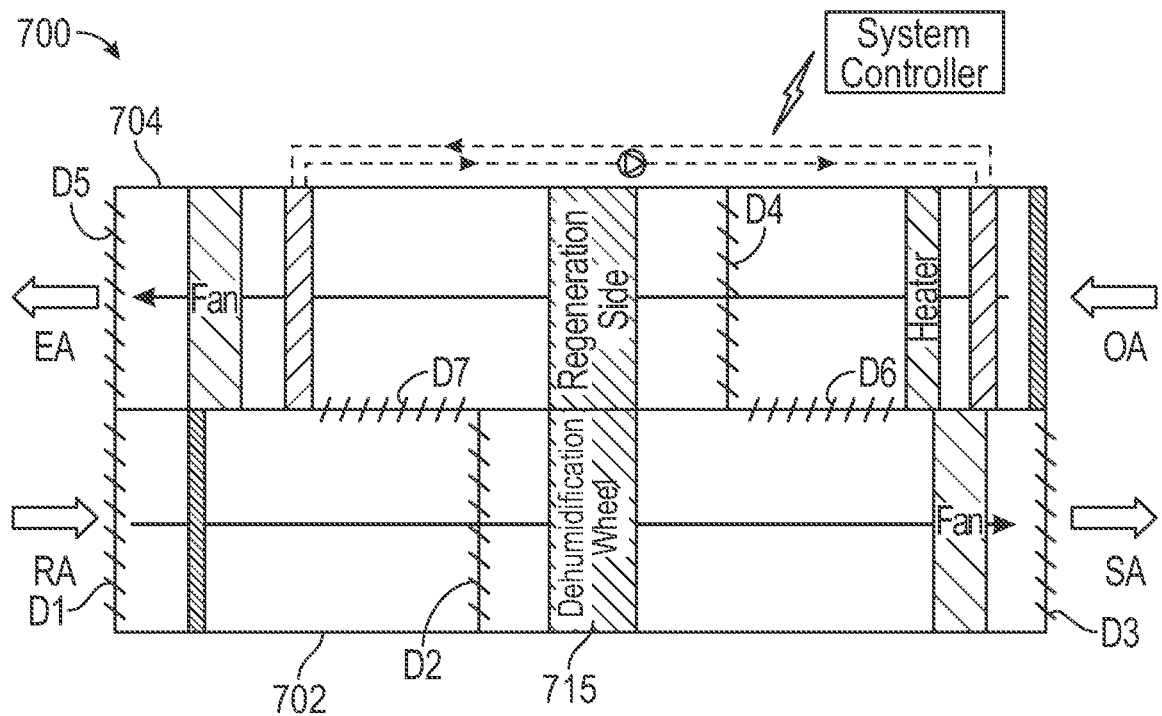
FIG. 7 is a schematic of an example dehumidification system in accordance with the present patent application.

FIG. 7 is an example of a dehumidification system 700 with a solid desiccant dehumidification unit, shown as a desiccant wheel 715 in the straight cabinet design having a supply plenum 702 and a scavenger plenum 704. Similarly, the solid desiccant dehumidification component can be used in the folded design of the dehumidification system. Another example of a solid desiccant dehumidification unit can include, but is not limited to, a rotary bed.

The regeneration unit in any of the example dehumidification systems described herein can utilize any known thermal regeneration process. In addition to the examples described above, the regeneration system can include, but is not limited to, vacuum multi-effect membrane distillation (VMEMD) (thermally driven distillation of the desiccant solution), gas boiler with condenser, vacuum assisted generator (similar to absorption chiller), multi-stage flash and membrane distillation.

FIG. 8 shows a process flow chart of a control logic 800 for the system controller 150 of the dehumidification system 100 of FIGS. 1A-1C. It is recognized that the control logic 800 can be applicable to the other examples of dehumidification systems described herein and shown in the accompanying figures.

In an example, the dehumidification system 100 can operate in two modes—dry mode and wet mode (blended mode can be excluded). The transition between modes can include standby to dry mode, dry mode to standby, and standby to wet mode, and then in reverse for each transition. When the system 100 is in standby mode, all dampers and valves can be in a closed position and the pumps and fans can be disabled.

For a given indoor air relative humidity (RH) setpoint and based on varying outdoor air conditions, the system 100 can provide the required dehumidification in different operating modes, however, such different modes may require different levels of heating and power usage. The control logic 800 can be used to improve the total energy efficiency of the system 100 and determine the appropriate mode based on predetermined criteria.

With reference to FIG. 8, inputs to the system controller 150 can include outdoor air humidity ratio/RH 802, indoor air humidity ratio/RH setpoint 804, and indoor air RH 806 (actual as measured). (The humidity ratio (or absolute humidity) of the indoor air or the outdoor air can be calculated using the dry bulb temperature of the indoor or outdoor air and the relative humidity.) If there is a difference between the indoor air RH 806 (as measured) and the indoor air RH setpoint, action is needed by the system controller 150.

At 808, a difference is measured between the indoor air humidity ratio setpoint 804 and the outdoor air humidity ratio 802. At 810, if the difference in humidity ratio is greater than 4.6 g/kg, then the wet mode can be locked out after a pre-determined time and the system 100 can operate in the dry mode at 812 because the outdoor air is sufficiently dry. However, if at 810, the difference in humidity ratio is less than 4.6 g/kg, then the system 100 can operate at the wet mode at 814.

When the system 100 is operating in the wet mode at 814, the control logic 800 can continue to evaluate whether to stay in the wet mode or transition to the dry mode. At 816, the control logic 800 monitors fan speed. If the supply air fan speed (see fan 118 in FIGS. 1A-1C) is at a minimum setting and the RH of the indoor air is less than the RH set point, at 818, the system 100 can transition to the dry mode at 812.

When the system 100 is operating in the dry mode at 812, the control logic 800 can continue to evaluate whether to stay in the dry mode or transition to the wet mode. At 820, the control logic 800 monitors fan speed. If the supply air fan speed is at a maximum setting and the RH of the indoor air is greater than the RH set point, at 822, the system 100 can transition to the wet mode at 814.

To help with mode transitions, each of the dry mode and wet mode can have its own variables for maximum and minimum supply fan speeds corresponding to 100% and 0% proportional integral derivative (PID) demand, respectively. These will be referred to as DryMin, DryMax, WetMin and WetMax.

The dry mode at 812 can be initiated when the supply fan PID reaches 15% (fans running at WetMin speed, adjustable) and the indoor RH remains below the indoor RH setpoint minus dead band for five minutes (adjustable). The system 100 can go to standby mode and then move to dry mode. When the system 100 is operating in the dry mode at 812, dampers D2 and D4 (see FIGS. 1A-1C) can be closed at 824 and dampers D6 and D7 can be open at 826.

The wet mode at 814 can be initiated when the supply fan PID reaches 100% (fans 118 running at DryMax speed) and the indoor RH remains above the indoor RH setpoint plus dead band for five minutes (adjustable). The system 100 can go to standby mode first, and then move to wet mode. The supply fan 118 can be controlled by PID until the indoor RH setpoint (for example, 78%, adjustable) is met. When the system is operating in the wet mode at 814, dampers D2 and D4 can be open at 828 and dampers D6 and D7 can be closed at 830.

The desiccant dehumidification systems described herein can be applied in any process dehumidification application, including but not limited to dehumidification of greenhouses and natatoriums, industrial dehumidification, or other commercial and residential comfort dehumidification applications, etc. The desiccant dehumidification systems described herein enable transition between different operating modes (i.e. wet mode, blend mode, and dry mode) to maximally utilize free dry/dehumidification from outdoor air to reduce dehumidification load of the system at various weather conditions. The desiccant dehumidification systems described herein can effectively reduce the wet operating hours of the air/desiccant energy exchangers and increase their lifespan (for example reducing the wet operating hours from 7202 hours to 205 hours in one year for a greenhouse dehumidification).

The different operating modes (wet mode, blended mode and dry mode) can be enabled by regulating various dampers installed inside the unit. The different operating modes can enable the dehumidification system to maximize use of the free, dry form of the outdoor air at various weather conditions, thus reducing the dehumidification load of the system and reducing the operating costs of the system. The different operating modes can also enable providing outdoor air ventilation.

The desiccant dehumidification systems described herein can use heat recovery technology to recover heat from exhaust regeneration air and preheat the inlet regeneration air in summer, and hence reduce the heating requirement for the desiccant regeneration process and use the same heat recovery device to recover heat from return air and preheat the supplied outdoor air in winter. Thus, the heating consumption can be reduced. The dehumidification systems described herein can provide outdoor air ventilation into the enclosed space most of the year and improve the indoor air quality. The dehumidification systems described herein can recover condensate water from the humid exhaust regeneration air or return air during the heat recovery process.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The present application provides for the following exemplary embodiments or examples, the numbering of which is not to be construed as designating levels of importance:

Example 1 provides a system for dehumidifying an enclosed space and the system can include a supply plenum configured to direct return air from the enclosed space through the supply plenum from a return air inlet to a supply air outlet, a scavenger plenum configured to direct outdoor air through the scavenger plenum from an outdoor air inlet to an exhaust air outlet, a dehumidification liquid-to-air membrane energy exchanger (LAMEE) arranged in the supply plenum and configured to selectively remove water vapor from the return air using a desiccant, the dehumidification LAMEE comprising a first desiccant flow path separated from an air flow path by a membrane, the dehumidification LAMEE configured to selectively circulate the desiccant through the first desiccant flow path and remove water from the return air in the air flow path, a regeneration unit arranged in the scavenger plenum and configured to selectively concentrate a dilute desiccant from the dehumidification LAMEE using the outdoor air passing through the regeneration unit, and a heat recovery system configured to heat the outdoor air in the scavenger plenum. The system can be configured to operate in a wet mode in which the dehumidification LAMEE and regeneration unit are operational and a dry mode in which the dehumidification LAMEE and regeneration unit are off or bypassed, and selection of the mode depends on outdoor air conditions. The heat recovery system can use either exhaust scavenger air or exhaust return air as a heat source, depending on the selected mode.

Example 2 provides the system of Example 1 optionally further comprising
one or more first dampers for controlling a flow of return air through the supply plenum and one or more second dampers for controlling a flow of outdoor air through the scavenger plenum.

Example 3 provides the system of Example 2 optionally configured such that the one or more first dampers comprises a dehumidifier damper configured to prevent or permit return air from flowing through the dehumidification LAMEE, and a first redirect damper configured to prevent or permit return air from flowing from the supply plenum into the scavenger plenum and out the exhaust air outlet.

Example 4 provides the system of Example 2 or 3 optionally configured such that the one or more second dampers comprises a regeneration damper configured to prevent or permit outdoor air from flowing through the regeneration unit, and a second redirect damper configured to prevent or permit outdoor air from flowing from the scavenger plenum into the supply plenum and out the supply air outlet.

Example 5 provides the system of any of Examples 1-4 optionally configured such that the dehumidification LAMEE is a first LAMEE and the regeneration unit is a second LAMEE.

Example 6 provides the system of any of Examples 1-5 optionally configured such that the regeneration unit comprises a direct or indirect contact air/liquid exchanger.

Example 7 provides the system of any of Examples 1-6 optionally further comprising
a controller configured to operate the system in the wet mode and the dry mode, and selection of the mode is a function of the outdoor air and a relative humidity (RH) of air in the enclosed space.

Example 8 provide the system of Example 7 optionally configured such that the controller controls at least one of an air flow rate and a fan speed in the supply plenum to maintain the air in the enclosed space at or near a RH setpoint.

Example 9 provides the system of any of Examples 1-8 optionally configured such that the system is configured to operate in a blended mode in which the dehumidification unit and the regeneration unit are both operational to dehumidify the return air and regenerate the dilute desiccant, and supply air to the enclosed space is a mixture of dehumidified return air and outdoor air.

Example 10 provides the system of any of Examples 1-9 optionally further comprising a dehumidification tank in fluid connection with the dehumidification LAMEE and a regenerator tank in fluid connection with the regeneration unit, wherein a desiccant transfer loop is configured to transfer desiccant between the dehumidifier tank and the regenerator tank.

Example 11 provides the system of any of Examples 1-10 optionally configured such that the heat recovery system comprises a glycol run around loop comprising a first coil in the scavenger plenum upstream of the regeneration unit and a second coil in the scavenger plenum downstream of the regeneration unit.

Example 12 provides a system for dehumidifying an enclosed space and the system can include a return air plenum having a return air inlet and a supply air outlet, the return air plenum configured to direct air from the enclosed space in a first air flow path from the return air inlet to the supply air outlet and a dehumidification unit arranged inside the return air plenum to selectively circulate a desiccant through the first desiccant flow path and remove water from the air in the first air flow path, a moisture content of the air at the supply air outlet being lower than a moisture content of the air at the return air inlet. The system can include a scavenger air plenum having a scavenger air inlet and an exhaust air outlet, the scavenger air plenum configured to direct outdoor air in a second air flow path from the scavenger air inlet to the exhaust air outlet and a regeneration unit arranged inside the scavenger air plenum to selectively circulate the desiccant through the regeneration unit and remove water from the desiccant to the air in the second air flow path, wherein a mass concentration of the desiccant at an outlet of the regeneration unit is higher than a mass concentration of the desiccant at an inlet of regeneration unit. The system can include a controller configured to operate the system in a plurality of operating modes based on conditions of the outdoor air and one or more setpoint parameters for air in the enclosed space, the plurality of operating modes comprising: a wet mode in which the dehumidification unit and the regeneration unit are both operational to dehumidify the return air and regenerate the dilute desiccant, and supply air to the enclosed space is dehumidified return air; a blended mode in which the dehumidification unit and the regeneration unit are both operational to dehumidify the return air and regenerate the dilute desiccant, and supply air to the enclosed space is a mixture of dehumidified return air and outdoor air; and a dry mode in which both the dehumidification unit and the regeneration unit are off or bypassed, and supply air to the enclosed space is outdoor air.

Example 13 provides the system of Example 12 optionally further comprising a heat recovery system to heat the outdoor air in the second air flow path, wherein a heat source for the heat recovery system depends on the operating mode of the system.

Example 14 provides the system of Example 13 optionally configured such that the heat source is hot exhaust air in the scavenger plenum downstream of the regeneration unit when the system is operating in the wet mode and the heat source is return air from the enclosed space when the system is operating in the dry mode.

Example 15 provides the system of Example 13 optionally configured such that the heat recovery system is a glycol run around loop comprising a glycol circuit having a first coil in the scavenger air plenum upstream of the regeneration unit and a second coil in the scavenger air plenum downstream of the regeneration unit.

Example 16 provides the system of any of Examples 13-15 optionally configured such that condensate from the outdoor air in the heat recovery system is collected for water usage.

Example 17 provides the system of any of Examples 12-16 optionally further comprising a plurality of dampers to control and vary the distribution of return air and outdoor air to the enclosed space as a function of the operating mode of the system.

Example 18 provides the system of Example 17 optionally configured such that the plurality of dampers comprises a regeneration damper in the scavenger air plenum upstream of the regeneration unit, wherein the regeneration damper is closed in the dry mode to redirect outdoor air from the scavenger air plenum to the supply air outlet.

Example 19 provides the system of Example 17 or 18 optionally configured such that the plurality of dampers comprises a first redirect damper between the scavenger air plenum and the return air plenum upstream of the regeneration unit, wherein the first redirect damper is open in the wet mode and blended mode to redirect at least a portion of outdoor air from the scavenger air plenum to the supply air outlet.

Example 20 provides the system of any of Examples 17-19 optionally configured such that the plurality of dampers comprises a dehumidification damper in the supply air plenum upstream of the dehumidification unit, wherein the dehumidification damper is closed in the dry mode to redirect return air from the supply air plenum to the scavenger air outlet.

Example 21 provides the system of any of Examples 17-20 optionally configured such that the plurality of dampers comprises a second redirect damper between the scavenger air plenum and the return air plenum upstream of the dehumidification unit, wherein the second redirect damper is open in the wet mode and blended mode to redirect at least a portion of return air in the supply air plenum to the scavenger air outlet.

Example 22 provides a method of providing dehumidification to an enclosed space using a dehumidification system. The method comprises directing return air from the enclosed space through a supply plenum having a return air inlet and a supply air outlet, selectively directing the return air through a dehumidification LAMEE arranged inside the supply plenum, a first moisture content of the return air being higher at an air inlet of the dehumidification LAMEE than a second moisture content of the return air at an air outlet of the dehumidification LAMEE, selectively directing a desiccant through the dehumidification LAMEE such that the desiccant removes water vapor from the return air, a first concentration of the desiccant at a desiccant inlet of the dehumidification LAMEE being higher than a second concentration of the desiccant at a desiccant outlet of the dehumidification LAMEE, directing outdoor air through a scavenger plenum having an outdoor air inlet and an exhaust air outlet, selectively directing the outdoor air through a regeneration unit arranged inside the scavenger plenum, a first moisture content of the outdoor air being lower at an air inlet of the regeneration unit than a second moisture content of the outdoor air at an air outlet of the regeneration unit, selectively directing the desiccant through the regeneration unit such that the outdoor air removes water vapor from the desiccant, a first concentration of the desiccant a desiccant inlet of the regeneration unit being lower than a second concentration of the desiccant at a desiccant outlet of the regeneration unit, operating the dehumidification system in multiple modes, a mode is selected based on outdoor air conditions and a setpoint for air in the enclosed space, selectively redirecting at least a portion of the return air in the supply plenum into the scavenger plenum as a function of the selected mode, selectively redirecting at least a portion of the outdoor air in the scavenger plenum into the supply plenum as a function of the selected mode, and heating the outdoor air in the scavenger plenum upstream of the regeneration unit using waste heat, wherein the waste heat is either exhaust scavenger air or exhaust return air, depending on the selected mode.

Example 23 provides the method of Example 22 optionally further comprising controlling a flow of return air and desiccant through at least one of the supply plenum and the dehumidification LAMEE as a function of the selected mode, and controlling a flow of outdoor air and desiccant through at least one of the scavenger plenum and the regeneration unit as a function of the selected mode.

Example 24 provides the method of Example 23 optionally configured such that controlling the flow of return air and desiccant through at least one of the supply plenum and the dehumidification LAMEE includes controlling a position of one or more first dampers.

Example 25 provides the method of Example 23 or 24 optionally configured such that controlling the flow of outdoor air and desiccant through at least one of the scavenger plenum and the regeneration unit includes controlling a position of one or more second dampers.

Example 26 provides the method of any of Examples 22-25 optionally further comprising selectively operating the regeneration unit during off-peak periods of operation of the dehumidification system to utilize dry outdoor air to regenerate the desiccant, and storing concentrated desiccant in a regenerator tank.

Example 27 provides the method of any of Examples 22-26 optionally configured such that heating the outdoor air in the scavenger plenum upstream of the regeneration unit comprises heating the outdoor air in the scavenger air plenum using a glycol run around loop comprising a first coil in the scavenger plenum upstream of the regeneration unit and a second coil in the scavenger plenum downstream of the regeneration unit, and glycol is configured to circulate between the first and second coils.

Example 28 provides a method, system, unit, product or apparatus of any one or any combination of Examples 1-27, which can be optionally configured such that all steps or elements recited are available to use or select from.

Various aspects of the disclosure have been described. These and other aspects are within the scope of the following claims.

What is claimed is:

1. A system for dehumidifying an enclosed space, the system comprising:
   a supply plenum including a return air inlet and a supply air outlet;
   a scavenger plenum including an outdoor air inlet and an exhaust air outlet;
   a desiccant dehumidifier arranged in the supply plenum and configured to remove water from air using a desiccant;
   a desiccant regenerator arranged in the scavenger plenum and operatively connected to the desiccant dehumidifier, the desiccant regenerator configured to remove water from a dilute desiccant using air passing through the desiccant regenerator;
   a heat recovery system including a first portion arranged in the scavenger plenum upstream of the desiccant regenerator and operatively connected to a second portion arranged in the scavenger plenum downstream of the desiccant regenerator, the first portion configured to reject heat to air flowing therethrough and the second portion configured to absorb heat from air flowing therethrough;
a dehumidifier damper arranged in the supply plenum upstream of the desiccant dehumidifier;
a regenerator damper arranged in the scavenger plenum upstream of the desiccant regenerator;
a first redirection damper connecting the supply plenum to the scavenger plenum upstream of the desiccant dehumidifier and downstream of the desiccant regenerator;
a second redirection damper connecting the supply plenum to the scavenger plenum downstream of the desiccant dehumidifier and upstream of the desiccant regenerator; and
a controller configured to operate the system in a plurality of modes, the plurality of modes comprising:
a wet mode in which the desiccant dehumidifier and the desiccant regenerator are operational, the dehumidifier damper and the regenerator damper are fully open, and the first and second redirection dampers are fully closed;
a dry mode in which the desiccant dehumidifier and the desiccant regenerator are off, the dehumidifier damper and the regenerator damper are fully closed, and the first and second redirection dampers are fully open; and
a blended mode in which the desiccant dehumidifier and the desiccant regenerator are operational, the dehumidifier damper and the regenerator damper are partially open, and the first and second redirection dampers are partially open.

2. The system of claim 1, wherein the desiccant dehumidifier comprises a first liquid-to-air membrane energy exchanger (LAMEE), the first LAMEE comprising a first desiccant flow path separated from a first air flow path by a first membrane and configured to circulate the desiccant through the first desiccant flow path and remove water from air in the first air flow path.

3. The system of claim 2, wherein the desiccant dehumidifier comprises a direct or indirect contact air/liquid exchanger.

4. The system of claim 1, wherein the desiccant regenerator comprises a second liquid-to-air membrane energy exchanger (LAMEE), the second LAMEE comprising a second desiccant flow path separated from a second air flow path by a second membrane and configured to circulate the desiccant through the second desiccant flow path and remove water from the dilute desiccant using air in the second air flow path.

5. The system of claim 4, wherein the desiccant regenerator comprises a direct or indirect contact air/liquid exchanger.

6. The system of claim 1, wherein the controller is configured to operate the system in the plurality of modes as a function of outdoor air and a relative humidity (RH) of air in the enclosed space.

7. The system of claim 1, wherein the controller controls at least one of an air flow rate and a fan speed in the supply plenum to maintain air in the enclosed space at or near a RH setpoint.

8. The system of claim 1, wherein, in the wet mode, supply air to the enclosed space is return air dehumidified by the desiccant dehumidifier.

9. The system of claim 1, wherein, in the dry mode, supply air to the enclosed space is outdoor air heated by the first portion of the heat recovery system.

10. The system of claim 1, wherein, in the blended mode, supply air to the enclosed space is a mixture of return air dehumidified by the desiccant dehumidifier and outdoor air.

11. The system of claim 1, further comprising:
a dehumidifier tank in fluid connection with the desiccant dehumidifier; and
a regenerator tank in fluid connection with the desiccant regenerator, wherein a desiccant transfer loop is configured to transfer desiccant between the dehumidifier tank and the regenerator tank.

12. The system of claim 1, wherein the heat recovery system comprises a glycol run around loop.

13. The system of claim 12, wherein the first portion of heat recovery system comprises a first coil in the scavenger plenum upstream of the using air and the second portion of the heat recovery system comprises a second coil in the scavenger plenum downstream of the desiccant regenerator.

14. The system of claim 1, wherein a heat source for the heat recovery system depends on the plurality of operating modes of the system.

15. The system of claim 14, wherein the heat source is hot exhaust air in the scavenger plenum downstream of the desiccant dehumidifier in the wet mode and return air from the enclosed space in the dry mode.

16. The system of claim 1, wherein the heat recovery system is configured to collect condensate from outdoor air for water usage.

17. A method of using a dehumidification system to dehumidify an enclosed space, the method comprising:
supplying supply air to the enclosed space through a supply air outlet of a supply plenum having a return air inlet;
directing outdoor air through an outdoor air inlet of a scavenger plenum having an exhaust outlet;
selectively directing return air through a desiccant dehumidifier arranged inside the supply plenum to remove water from the return air using a desiccant;
selectively directing the outdoor air through a desiccant regenerator arranged inside the scavenger plenum to remove water from the desiccant using the outdoor air;
directing the outdoor air through a first portion of a heat recovery system arranged in the scavenger plenum upstream of the desiccant regenerator, the first portion of the heat recovery system configured to reject heat to air flowing therethrough;
selectively directing one or both of the outdoor air and the return air through a second portion of the heat recovery system arranged in the scavenger plenum downstream of the desiccant regenerator, the second portion of the heat recovery system configured to absorb heat from air flowing therethrough;
operating the dehumidification system in a plurality of modes based on outdoor air conditions and a setpoint for air in the enclosed space, the plurality of modes comprising;
a wet mode in which the desiccant dehumidifier and the desiccant regenerator are operational, a dehumidifier damper arranged in the supply plenum upstream of the desiccant dehumidifier and a regenerator damper arranged in the scavenger plenum upstream of the desiccant regenerator are fully open, and a first redirection damper connecting the supply plenum to the scavenger plenum upstream of the desiccant dehumidifier and downstream of the desiccant regenerator and a second redirection damper connecting the supply plenum to the scavenger plenum downstream of the desiccant dehumidifier and upstream of the desiccant regenerator are fully closed;

a dry mode in which the desiccant dehumidifier and the desiccant regenerator are off, the dehumidifier damper and the regenerator damper are fully closed, and the first and second redirection dampers are fully open; and a blended mode in which the desiccant dehumidifier and the desiccant regenerator are operational, the dehumidifier damper and the regenerator damper are partially open, and the first and second redirection dampers are partially open.

18. The method of claim 17, wherein a heat source for the heat recovery system depends on the plurality of operating modes of the system.

19. The method of claim 18, wherein the heat source is hot exhaust air in the scavenger plenum downstream of the desiccant dehumidifier in the wet mode and return air from the enclosed space in the dry mode.

20. The method of claim 17, further comprising collecting condensate from outdoor air using the heat recovery system.

21. The system of claim 1, wherein, in the blended mode, supplying air to the enclosed space comprises supplying a mixture of return air dehumidified by the desiccant dehumidifier and outdoor air.

22. The method of claim 17 further comprising:
selectively operating the regeneration unit during off-peak periods of operation of the dehumidification system to utilize dry outdoor air to regenerate the desiccant; and
storing concentrated desiccant in a regenerator tank.

* * * * *